Figure 1:
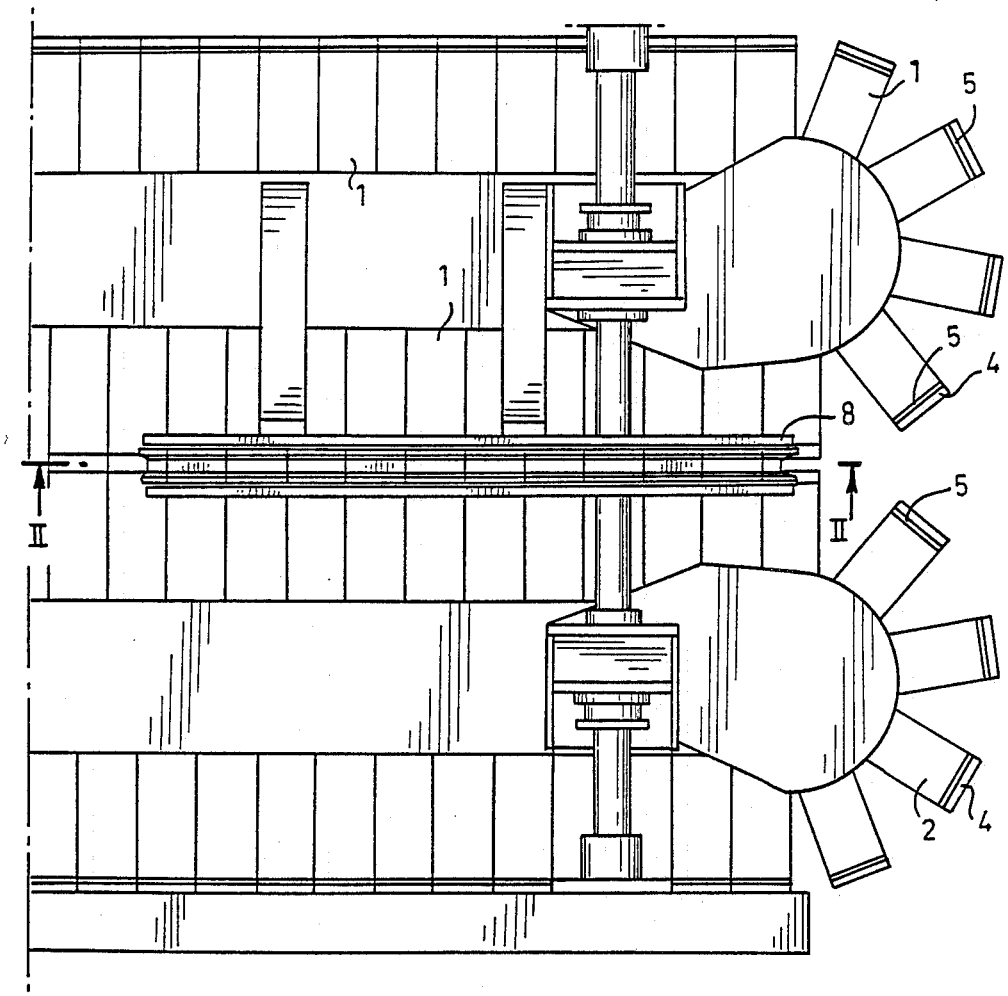

United States Patent [19]

Järvenkylä et al.

[11] Patent Number: 4,952,362
[45] Date of Patent: Aug. 28, 1990

[54] METHOD AND APPARATUS FOR THE PRODUCTION OF PIPE

[75] Inventors: Jyri Järvenkylä, Salpakangas; Pauli Sillanpää, Lahti, both of Finland

[73] Assignee: Uponor N.V., Philipsburg, Netherlands Antilles

[21] Appl. No.: 376,165

[22] Filed: Jul. 6, 1989

Related U.S. Application Data

[63] Continuation-in-part of Ser. No. 124,114, filed as PCT FI87/00041 on Mar. 24, 1987, published as WO87/05857 on Oct. 8, 1987, abandoned.

[30] Foreign Application Priority Data

Mar. 24, 1986 [FI] Finland ................................. 861227

[51] Int. Cl.$^5$ ............................................. B29C 47/90
[52] U.S. Cl. .............................. 264/209.2; 425/233; 425/326.1; 425/336
[58] Field of Search .................. 264/508, 209.1, 209.2; 425/190, 220, 233, 324.1, 325, 329, 335, 336, 345, 363, 369, 371, 378, 396

[56] References Cited

U.S. PATENT DOCUMENTS

| | | | |
|---|---|---|---|
| 2,817,875 | 12/1957 | Harris et al. | 425/329 |
| 2,866,230 | 12/1958 | Holte | 425/324.1 |
| 3,776,679 | 12/1973 | Hegler | 425/396 |
| 3,881,851 | 5/1975 | Allanic et al. | 425/185 |
| 3,941,543 | 3/1976 | Buonanno | 425/329 |
| 4,021,178 | 5/1977 | Braun | 425/325 |
| 4,504,206 | 3/1985 | Lupke et al. | 425/335 |
| 4,681,526 | 7/1987 | Lupke et al. | 425/336 |

FOREIGN PATENT DOCUMENTS

| | | |
|---|---|---|
| 1203904 | 4/1960 | Fed. Rep. of Germany . |
| 1233128 | 1/1963 | Fed. Rep. of Germany . |
| 1203940 | 10/1965 | Fed. Rep. of Germany . |
| 2248139 | 4/1975 | France . |
| 764997 | 9/1980 | U.S.S.R. . |
| 1032691 | 6/1966 | United Kingdom . |

Primary Examiner—Jill L. Heitbrink
Attorney, Agent, or Firm—Ladas & Parry

[57] ABSTRACT

A method and apparatus for producing a pipe transports first and second sets of chill moulds respectively along first and second endless paths, the chill moulds of each set being so transported one after another, and the endless paths being positioned such that junction faces of the respective chill moulds of the respective sets are positioned against each other in a pipe moulding zone of the endless paths. So positioning the respective chill moulds of the respective sets also defines outer surfaces thereof that are opposite the junction faces and outer surfaces that extend along edges of the junction faces at least generally in the direction of the transporting of the chill moulds. The chill moulds are locked together in the pipe moulding zone with locking surfaces respectively on the outer surfaces of the chill moulds that extend along edges of the junction faces, locking pieces having substantially the same lengths as the chill moulds and U-shaped cross sections, and locking piece transporting means for transporting first and second sets of the locking pieces one after another respectively along two locking-pipe endless paths at the same rate as the chill moulds are transported. The locking-piece endless paths are positioned in the pipe moulding zone such that insides of the U-shapes of the locking pieces engage and lock together the locking surfaces of the chill moulds in the pipe moulding zone. The outer surfaces of the chill moulds that are opposite the junction faces thereof are also pressed while the chill moulds are in the pipe moulding zone for pressing the chill moulds together in a direction perpendicular to the junction faces of the chill moulds.

2 Claims, 2 Drawing Sheets

METHOD AND APPARATUS FOR THE PRODUCTION OF PIPE

This is a continuation-in-part of copending application Ser. No. 07/124,114 filed on as PCT FI87/00041 on Mar. 24, 1987, published as WO87/05857 on Oct. 8, 1987 now abandoned.

This invention relates to a method and apparatus for moulding pipes, with chill moulds transported one after another along two endless paths respective chill moulds on the respective paths being positioned against each other for the formation of a tubular mould, in a pipe moulding zone.

German Offenlegungsschrift 1,203,940 discloses an apparatus for the extrusion of plastic pipes in which semicircular chill moulds are pressed against each other by rolls pressed against the back surfaces of the chill moulds. In some constructions, the press force can be adjusted by means of a spring load. The press force of the rolls thus acts perpendicularly to the respective junction faces of the chill moulds.

This known structure is very suitable for manufacturing plastic pipes having broad low ribs, because the pressure of the plastic substance is typically below 1 bar for this, and the chill moulds are therefore not exposed to any great forces which would tend to separate the chill moulds from each other.

However, it is necessary to apply considerably higher operational pressures, typically about 30 bar and intermittently even 50 bar, when manufacturing pipes which have thin, high ribs, for example, and which are made of a material of high viscosity. At such high pressures, chill moulds designed for low pressures are subjected to a transformation, whereby the radius of curvature of the chill moulds increases, i.e. the chill moulds get straighter, as a result of which the crosssection of the pipes deviates from a round form. For the prevention of this disadvantageous effect, the chill moulds of apparatuses using high pressures must be extremely massive, weighing typically 200 kg each. It is self-evident that the apparatus is thereby very heavy and expensive.

A further problem of apparatuses having high operational pressure is that high friction forces are often created between the chill moulds and means provided for the support thereof, which causes problems lubrication. E.g. in the apparatuses according to the abovementioned German Offenlegungsschrift, the shafts of the rolls would be exposed to an extremely high strain, wherefore their useful life would be short.

Another German Offenlegungsschrift 1,233,128 discloses an assembly of locking rolls supported on the outer surface of the chill moulds in the vicinity of those edges of the chill moulds which are to be pressed against each other. Fixed rolls having a V-shaped crosssection are provided adjacent the extruder beside the row of chill moulds. When the chill moulds are positioned against each other within the area of the pipe moulding zone, the rolls receive part of the forces caused by the pressure. At high pressures, a disadvantage of this solution is the rapid wearing of the counter surfaces and the transmission of great locking forces to the frame structures of the apparatus. The application of the method is therefore limited to pipe production carried out at low pressures.

Also, the chill moulds cannot be aligned in the longitudinal direction in the latter method, and the same applies to the method described earlier. A problem with older apparatuses, in particular, for these methods, therefore, is that one of the chill moulds in one of the endless chains thereof tends to be left behind on account of wearing of its operational clearances and the aligning of its studs which are provided between the chill moulds. As a result, the product obtained is unsatisfactory because the portion of the ribs on the opposite sides of the pipe are somewhat out of alignment with each other.

An object of the present invention is to provide a method and an apparatus in which the shape of the chill moulds is maintained unchanged all the time and in which no friction occurs in the direction of chill mould transport between the chill moulds and the support pressing them against each other. To this end, a method according to the invention is characterized in that locking devices are transported with locking surfaces of the chill moulds in a pipe moulding zone.

This avoids transport direction friction between the locking surfaces and the locking devices while the chill moulds form a mould for the production of a pipe, i.e. in the pipe moulding zone, by virtue whereof the durability of the apparatus is considerably increased and its power demand is decreased. In addition, the lubrication formerly required between these which had caused problems, becomes nearly unnecessary.

The invention is also concerned with an apparatus for the production of a pipe having chill moulds positioned one after another and transported in first and second sets respectively along two endless paths in such a manner that respective chill moulds of the sets are positioned against each other within a pipe moulding zone along the paths for the formation of a tubular mould. Locking surfaces are provided on said chill moulds adjacent to those edges thereof which are to be positioned against each other, i.e. on outer surfaces of the chill moulds that extend proximately along edges of junction faces of the chill moulds at least generally in the direction of the transporting of the chill moulds. The locking devices are arranged to be pressed against said locking surfaces of the chill moulds for pressing the chill moulds against each other within the pipe moulding zone.

The apparatus according to the invention is characterized in that said locking devices are moveable in the direction of motion of the chill moulds so that they are displaceable with said locking surfaces.

According to one preferred embodiment of the apparatus according to the invention, the locking devices are positioned one after another in two endless paths positioned in the plane of the junction face of the chill moulds. The locking devices are thereby diplaced, like the chill moulds, along endless paths which, however, are positioned in a plane extending perpendicularly to the plane of the chill mould paths.

It is of advantage for guiding the locking devices that the locking devices are supported on a supporting rail within the pipe moulding zone.

According to one preferred embodiment of the invention, the apparatus is provided with a motor which is arranged to transport the locking devices forwards along the paths. When the locking devices are transported forwards by the motor, an advantage is achieved in that the movements of the locking devices and the chill moulds can be controlled accurately. Additionally, the locking devices and the locking surfaces of the chill moulds can be such in shape that the locking devices transportingly press the chill moulds forwards. The power demand of the main displacing chains, i.e. endless paths, of the chill moulds is decreased.

In its simplest form, each of the locking means is formed by a material piece or body having an U-shaped recess the side or leg walls of which form supporting surfaces respectively arranged to be pressed against the locking surfaces of the chill moulds. By virtue of the shape thereof, the material piece receives all or most of mould opening forces exerted on the chill moulds, and if the former rigid, the friction between the piece and the supporting rail thereof is very low.

The press force exerted on the locking surfaces of the chill moulds can be adjusted by a movement of the locking devices in the radial direction of the chill moulds if the distance between the supporting surfaces increases towards the free edge of the side walls and if the locking surfaces of the chill moulds are substantially parallel to said supporting surfaces. For this, the angle between each the junction face and the locking surface most adjacent thereto is preferably from about 3° to 20°, and most preferably about 12°.

The locking devices are preferably formed as locking pieces, each having the length of the chill moulds and a U-shaped cross-section.

The inventors have realized that the locking devices, which exert a force on the edges of the chill moulds, are not alone able to wholly maintain the shape of the chill moulds, and therefore it is suggested according to the invention that besides the locking devices, supports, which are known per se, be arranged to be pressed against the outer surfaces of the chill moulds in the pipe moulding zone in a direction perpendicular to the plane of the junction faces of the chill moulds in the pipe moulding zone. By thus exposing the chill moulds to external forces both at the edges of the chill moulds and in the middle thereof, the semicircular shape of the chill moulds is maintained even at high pressures. Such pressures are in a range of from about 2 bar to about 50 bar, depending in part on the viscosity of the material being moulded and in part on the shape of the pipe being moulded, particularly if the latter has longitudinally spaced, transverse, thin, high, ribs, each in a height to thickness ratio of from about 3:1 to about 6:1, and preferably about 4:1, as contemplated by the invention.

Figure 2:
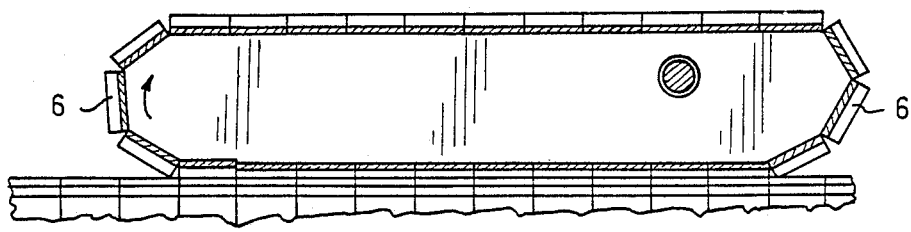
Figure 4:
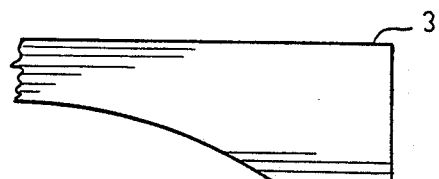
Figure 5:
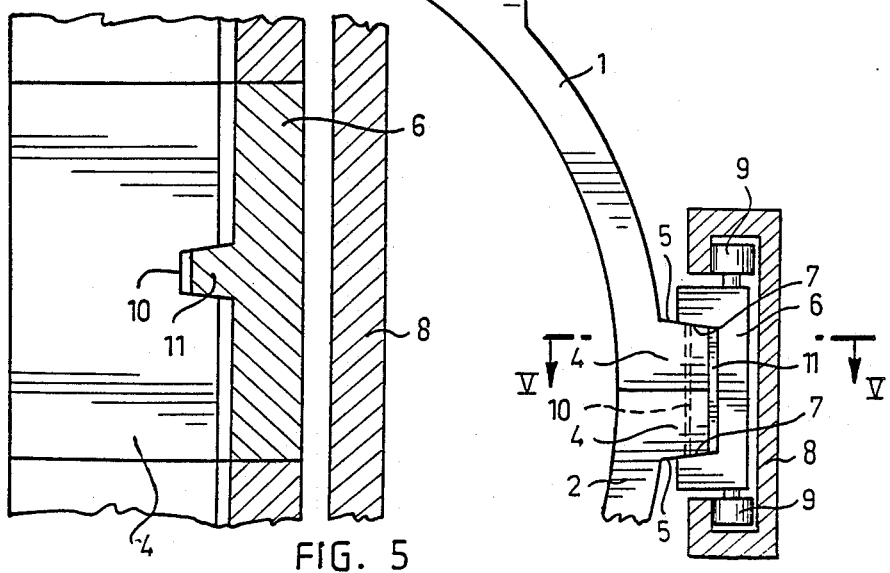

One preferred embodiment of the invention will be described more closely below with reference to the attached drawing, wherein FIG. 1 is a side view of the apparatus, FIG. 2 is a section along the line II ... II shown in FIG. 1, FIG. 3 is a vertical section of the apparatus, FIG. 4 illustrates a detail of a chill mould and the locking means, and FIG. 5 is a cross-section along the line V...V shown in FIG. 4.

Figure 3:
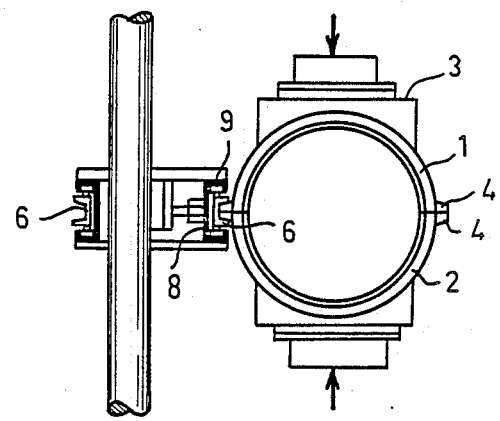

FIG. 1 shows chill moulds 1, 2 which are transported along two endless paths and which are semicircular in cross-section so that a tubular mould, see FIG. 3, is formed when they meet at the beginning of or before a pipe moulding zone. The pipe moulding zone means that portion of a pipe production apparatus in which the raw material is formed into a pipe and in which there usually prevails a high pressure. The outer surface of the chill moulds is provided with a sliding surface 3 which extends in parallel with the plane of the junction faces of the chill moulds and whereon a press force is exerted in a known manner to press the chill moulds against each other. Since the driving power and the control of the chill moulds 1, 2 are effected in a conventional manner, these are not more closely discussed here.

In order to effect the closing force of the chill moulds, a counter piece 4 is provided on the outer surface of the chill moulds close to the junction face, whereby said piece has the length of the chill mould and is provided with a locking surface 5 protruding from the outer surface of the chill mould and facing away from the junction face.

According to the embodiment shown in the figures, the apparatus according to the invention comprises two endless paths along which locking means 6 having the same length as the chill moulds are displaced. Said means are formed by U-shaped locking pieces 6, the inner surface of the branches thereof forming a supporting surface 7 which is arranged to be pressed against the locking surfaces 5. The locking pieces 6 are placed beside the extruder on a supporting rail 8 having a U-shaped cross-section to be transported thereon by means of rolls 9. One of the two locking piece paths is shown as a top view in FIG. 2, while it appears from FIGS. 1 and 3 that the paths are positioned in the plane of the junction faces of the chill moulds. The locking piece paths can have their own source of driving power, whereby the locking pieces are displaced along the path by the driving power. Alternatively the locking pieces can be displaced freely along the paths.

As appears from FIG. 4 in particular, the supporting surfaces 7 of the locking pieces 6 are so formed that the distance therebetween increases towards the free end of the branches. The locking surface 5 of the counter pieces 4 is correspondingly at an angle with respect to the junction faces of the chill moulds. The surfaces 5 and 7 are preferably made parallel with each other. A wedge effect is thereby created between said surfaces, as a result whereof the force exerted on the locking surfaces 5 by the supporting surfaces 7 is adjustable by displacing the locking piece 6 in the radial direction of the chill moulds. In addition, radial forces, i.e. forces acting in the direction of the junction faces, can be exerted on the sides of the chill moulds by virtue of the position of the surfaces 5 and 7.

As shown in FIGS. 4 and 5, the counter pieces 4 are provided with grooves 10 extending perpendicularly to the direction of motion of the pieces, and the locking pieces 6 are correspondingly provided with ribs 11 which fit the grooves for the alignment of the adjacent chill moulds 1, 2 with respect to each other in the direction of the production line.

The apparatus according to the invention operates as follows. When the chill moulds 1, 2 reach the pipe moulding zone to form a circular mould, the counter pieces 4, which protrude from the side of the chill moulds, are inserted in pairs into a space between the supporting surfaces 7 of the locking pieces 6, and are wedged in place therein. When the chill moulds are displaced forwards along the extruder, the locking pieces follow them, being displaced along the supporting rail 8 by means of the rolls 9.

In order to maintain the proper shape thereof, the chill moulds are exposed to closing forces both through the sliding surfaces 3 and the locking surfaces 5. The force exerted on the locking surfaces are perpendicular to the junction faces and possibly also parallel to the junction faces. All forces are preferably adjustable.

By virtue of the structure according to the invention, no notable friction occurs between the chill moulds and the locking means keeping them in position, on account whereof the power consumption of the apparatus is particularly low, and the structures can be light. The friction is especially low if no locking forces are exerted on the sliding surfaces 3 of the chill moulds, which is possible, too.

After the chill moulds have passed by the pipe moulding zone, the locking pieces 6 are detached from the locking surfaces 5 of the chill moulds, as shown in FIG. 2, so that the chill moulds are again able to separate from each other to follow the paths thereof.

The locking means can be constructed in other ways, too. So it is possible to leave out the grooves and the ribs of the counter pieces and the locking pieces, respectively. The locking surfaces 5 can be provided on the chill moulds in some other ways than by means of protruding pieces 4, e.g. by forming a notch on the outer surface of the chill moulds, whereby one surface of the notch acts as a locking surface.

We claim:

1. A method of producing a pipe, the method comprising:

transporting first and second sets of chill moulds respectively along first and second endless paths, the chill moulds of each set being so transported one after another, and the endless paths being positioned such that junction faces of the respective chill moulds of the respective sets are positioned against each other in a pipe moulding zone of the endless paths, so positioning the respective chill moulds of the respective sets also defining outer surfaces thereof that are opposite the junction faces;

locking the chill moulds together in the pipe moulding zone with locking surfaces that respectively extend along the outer surfaces of the chill moulds at least generally in the direction of the transporting of the chill moulds proximately along edges of the junction faces, locking pieces having recesses having U-shaped cross sections, and locking piece transporting means for transporting first and second sets of the locking pieces one after another respectively along two locking-piece endless paths at the same rate as the chill moulds are transported, the locking-piece endless paths being positioned in the pipe moulding zone such that supporting surfaces on side walls of the U-shaped recesses of the locking pieces engage the locking surfaces of the chill moulds to press together the junction faces of the chill moulds in the pipe moulding zone;

opposingly pressing against the outer surfaces of the chill moulds while the chill moulds are in the pipe moulding zone for further pressing the junction faces of the chill moulds together direction perpendicular to the junction faces of the chill moulds; and moulding a pipe having thin, high longitudinally spaced, transverse ribs, each in a height to thickness ratio of from about 3:1 to about 6:1, in the pipe moulding zone at a pressure of from about 2 bar to about 50 bar.

2. An apparatus for producing a pipe, the apparatus comprising:

chill mould means for transporting first and second sets of chill moulds respectively along first and second endless paths, the chill moulds of each set being so transported one after another, and the endless paths being positioned such that junction faces of the respective chill moulds of the respective sets are positioned against each other in a pipe moulding zone of the endless paths, so positioning the respective chill moulds of the respective sets also defining outer surfaces thereof that are opposite the junction faces, the chill moulds being configured for moulding thin, high longitudinally spaced, transverse ribs on a pipe;

locking means for locking the chill moulds together in the pipe moulding zone, the locking means comprising locking surfaces that respectively extend along the outer surfaces of the chill moulds at least generally in the direction of the transporting of the chill moulds proximately along edges of the junction faces, locking pieces having recesses having U-shaped cross sections, and locking piece transporting means for transporting first and second sets of the locking pieces one after another respectively along two locking-piece endless paths at the same rate as the chill moulds are transported, the locking-piece endless paths being positioned in the pipe moulding zone such that supporting surfaces on side walls of the U-shaped recesses of the locking pieces engage the locking surfaces of the chill moulds to press together the junction faces of the chill moulds in the pipe moulding zone, the angle between each junction face and the most adjacent locking surface of each chill mould being from about 3° to about 20° and the supporting surface engaged with such locking surface being parallel to the latter; and supporting means opposingly pressing against the outer surfaces of the chill moulds while the chill moulds are in the pipe moulding zone for further pressing the junction faces of the chill moulds together.

* * * * *